(12) United States Patent
Wang et al.

(10) Patent No.: US 11,770,008 B2
(45) Date of Patent: Sep. 26, 2023

(54) CONTROL SYSTEM AND METHOD FOR MEDIUM-VOLTAGE PHOTOVOLTAIC DISTRIBUTION SYSTEM

(71) Applicant: Tsinghua University, Beijing (CN)

(72) Inventors: Jiangfeng Wang, Beijing (CN); Kai Sun, Beijing (CN); Haixu Shi, Beijing (CN)

(73) Assignee: Tsinghua University, Beijing (CN)

( * ) Notice: Subject to any disclaimer, the term of this patent is extended or adjusted under 35 U.S.C. 154(b) by 242 days.

(21) Appl. No.: 17/281,503

(22) PCT Filed: Jul. 31, 2020

(86) PCT No.: PCT/CN2020/106213
§ 371 (c)(1),
(2) Date: Mar. 30, 2021

(87) PCT Pub. No.: WO2021/203592
PCT Pub. Date: Oct. 14, 2021

(65) Prior Publication Data
US 2022/0302713 A1    Sep. 22, 2022

(30) Foreign Application Priority Data

Apr. 7, 2020   (CN) .......................... 202010263396.4

(51) Int. Cl.
*H02J 3/46*      (2006.01)
*H02M 3/157*     (2006.01)
*H02M 7/5395*    (2006.01)

(52) U.S. Cl.
CPC ............... *H02J 3/46* (2013.01); *H02M 3/157* (2013.01); *H02M 7/5395* (2013.01); *H02J 2300/26* (2020.01)

(58) Field of Classification Search
CPC ........ H02J 2300/26; H02J 3/46; H02M 3/157; H02M 7/5395
See application file for complete search history.

(56) References Cited

U.S. PATENT DOCUMENTS

2013/0285453 A1   10/2013   Hurst et al.
2014/0005845 A1*  1/2014    Thomas .................. H02J 3/381
                                                    700/297
(Continued)

FOREIGN PATENT DOCUMENTS

CN    104578883 A    4/2001
CN    101980436 A    2/2011
(Continued)

*Primary Examiner* — Harry R Behm
(74) *Attorney, Agent, or Firm* — Wolf, Greenfield & Sacks, P.C.

(57) ABSTRACT

The embodiments of the present invention provide a control system and method for a medium-voltage photovoltaic distribution system. The medium-voltage photovoltaic distribution system includes N photovoltaic modules, N DC-DC converters, a DC-AC converter and a line-frequency transformer. Outputs of the N DC-DC converters are connected in parallel to a DC bus. The DC bus is connected to the DC-AC converter. The line-frequency transformer is configured to connect to a medium-voltage AC grid. The control system includes a bus voltage sampling circuit and N DC-DC converter control circuits corresponding to the N DC-DC converters respectively. Each DC-DC converter control circuit includes a bus voltage sampling circuit, a photovoltaic sampling circuit, a droop controller, a maximum power point tracking controller, an input voltage loop regulator and a pulse width modulation wave generating circuit. It can greatly simplify the communication system and improve the reliability of the control system that the DC bus voltage is used to replace a signal line for communication.

10 Claims, 5 Drawing Sheets

(56) References Cited

U.S. PATENT DOCUMENTS

| | | | |
|---|---|---|---|
| 2016/0322827 A1* | 11/2016 | Gupta | ............ H02J 3/381 |
| 2019/0140453 A1 | 5/2019 | Yi et al. | |
| 2020/0021236 A1* | 1/2020 | Pan | ............ H02J 3/381 |

FOREIGN PATENT DOCUMENTS

| | | |
|---|---|---|
| CN | 102969707 A | 3/2013 |
| CN | 103166239 A | 6/2013 |
| CN | 104135033 A | 11/2014 |
| CN | 104184140 A | 12/2014 |
| CN | 105610231 A | 5/2016 |
| CN | 105790310 A | 7/2016 |
| CN | 105932663 A | 9/2016 |
| CN | 106786737 A | 5/2017 |
| CN | 107257140 A | 10/2017 |
| CN | 107394829 A | 11/2017 |
| CN | 107591834 A | 1/2018 |
| CN | 108258718 A | 7/2018 |
| CN | 110086200 A | 8/2019 |
| CN | 110121820 A | 8/2019 |
| CN | 110212517 A | 9/2019 |
| CN | 110957763 A | 4/2020 |
| CN | 111446735 A | 7/2020 |
| WO | WO 2019/209627 A1 | 10/2019 |

\* cited by examiner

CONTROL SYSTEM AND METHOD FOR MEDIUM-VOLTAGE PHOTOVOLTAIC DISTRIBUTION SYSTEM

CROSS-REFERENCE TO RELATED APPLICATIONS

This application is a 35 U.S.C. § 371 National Phase filing of International Application No. PCT/CN2020/106213, filed on Jul. 31, 2020, entitled "CONTROL SYSTEM AND METHOD FOR MEDIUM-VOLTAGE PHOTOVOLTAIC DISTRIBUTION SYSTEM," which claims priority to and the benefit of Chinese Patent Application No. 202010263396.4, filed on Apr. 7, 2020. The entire contents of these applications are incorporated herein by reference in their entirety.

TECHNICAL FIELD

The present invention relates to the field of photovoltaic generation control technologies and, particularly, relates to a control system and method for a medium-voltage photovoltaic distribution system.

BACKGROUND

With the increasingly serious problems such as energy shortage and environmental pollution, renewable energy sources such as solar energy, wind energy and so on have been widely studied and applied due to their abundance, cleanliness, environment friendliness and many other advantages.

Facing the application requirements of large-scale photovoltaic power stations, medium-voltage-based photovoltaic generation systems are higher in efficiency and lower in cost as compared with traditional low-voltage systems. Medium-voltage photovoltaic distribution systems mostly employ a multistring structure, which is composed of a plurality of distributed direct current-direct current converters (DC-DC converters) and a large-capacity centralized direct current-alternating current converter (DC-AC converter). The DC-DC converters are connected to their photovoltaic arrays respectively. The outputs of the DC-DC converters are connected in parallel. Electric energy is inverted by the centralized DC-AC converter, and then transported to an AC grid.

To implement the energy dispatching and management for the medium-voltage photovoltaic distribution system, it is usually necessary to introduce a communication signal line between the distributed DC-DC converters and the DC-AC converter. However, in view of the large number and wide distribution area of the photovoltaic arrays of the large-scale photovoltaic power stations, it is difficult to achieve rapid real-time communication between the DC-DC converters and the DC-AC converter. Thus, it can be seen that the traditional control method based on signal line communication is difficult to apply to the medium-voltage photovoltaic distribution systems which are distributed in a wide area.

SUMMARY

In view of the above problems, the present invention is proposed. The present invention provides a control system and method for a medium-voltage photovoltaic distribution system.

According to one aspect of the present invention, a control system for a medium-voltage photovoltaic distribution system is provided. The medium-voltage photovoltaic distribution system includes: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1, wherein the control system includes a bus voltage sampling circuit and N DC-DC converter control circuits corresponding to the N DC-DC converters respectively, wherein the bus voltage sampling circuit is configured to sample a bus voltage signal $U_{dc}$ of the DC bus;

each DC-DC converter control circuit of the N DC-DC converter control circuits includes a bus voltage sampling circuit, a photovoltaic sampling circuit, a droop controller, a maximum power point tracking controller, an input voltage loop regulator and a pulse width modulation wave generating circuit;

the photovoltaic sampling circuit is configured to sample a photovoltaic voltage signal $U_{PV}$ and a photovoltaic current signal $I_{PV}$ output by a corresponding photovoltaic module;

the droop controller is connected to the bus voltage sampling circuit, and is configured to receive the bus voltage signal $U_{dc}$ from the bus voltage sampling circuit and output a power weight coefficient $K_{MPPT}$;

the maximum power point tracking controller is connected to the droop controller and the photovoltaic sampling circuit, and is configured to receive the photovoltaic voltage signal $U_{PV}$ and the photovoltaic current signal $I_{PV}$ from the photovoltaic sampling circuit, receive the power weight coefficient $K_{MPPT}$ from the droop controller, and track a power point based on the photovoltaic voltage signal $U_{PV}$, the photovoltaic current signal $I_{PV}$ and the power weight coefficient $K_{MPPT}$ to obtain a photovoltaic input voltage reference signal $U_{PVref}$;

the input voltage loop regulator is connected to the maximum power point tracking controller and the photovoltaic sampling circuit, and is configured to receive a voltage difference signal obtained by subtracting the photovoltaic voltage signal $U_{PV}$ from the photovoltaic input voltage reference signal $U_{PVref}$ and output a modulation signal for a corresponding DC-DC converter; and the pulse width modulation wave generating circuit is connected to the input voltage loop regulator and the corresponding DC-DC converter, and is configured to receive the modulation signal from the input voltage loop regulator, generate a drive signal corresponding to the modulation signal, and output the drive signal to the corresponding DC-DC converter.

As an example, the power weight coefficient $K_{MPPT}$ falls in a range of [0, 1]; and if $K_{MPPT}=1$, the medium-voltage photovoltaic distribution system operates in a maximum power point tracking mode; and if $0 \leq K_{MPPT} < 1$, the medium-voltage photovoltaic distribution system operates in a power dispatching mode.

As an example, the control system also includes a DC-AC converter control circuit corresponding to the DC-AC converter, wherein the DC-AC converter control circuit includes an AC grid sampling and calculating circuit, an active power loop regulator, an amplitude limiting unit, a bus voltage loop regulator, an active current loop regulator, a reactive current loop regulator and a sine pulse width modulation wave generating circuit, wherein the AC grid sampling and calculating circuit is configured to sample an AC voltage signal and an AC current signal output by the DC-AC converter, and calculate an active current signal $i_d$, a reactive current signal $i_q$ and an active power signal P based on the AC voltage signal and the AC current signal;

the active power loop regulator is connected to the AC grid sampling and calculating circuit, and is configured to receive a power difference signal obtained by subtracting the active power signal P from a predetermined active power reference signal $P_{ref}$, and output a voltage-regulating signal;

the amplitude limiting unit is connected to the active power loop regulator, and is configured to receive the voltage-regulating signal from the active power loop regulator and output a DC bus voltage reference signal $U_{dcref}$;

the bus voltage loop regulator is connected to the amplitude limiting unit and the bus voltage sampling circuit, and is configured to receive a voltage difference signal obtained by subtracting the bus voltage signal $U_{dc}$ from the DC bus voltage reference signal $U_{dcref}$, and output an active current reference signal $i_{dref}$;

the active current loop regulator is connected to the bus voltage loop regulator and the AC grid sampling and calculating circuit, and is configured to receive a first current difference signal obtained by subtracting the active current signal $i_d$ from the active current reference signal $i_{dref}$ and output a first modulation signal $u_{r1}$;

the reactive current loop regulator is connected to the AC grid sampling and calculating circuit, and is configured to receive a second current difference signal obtained by subtracting the reactive current signal $i_q$ from a predetermined reactive current reference signal $i_{qref}$, and output a second modulation signal $u_{r2}$; and the sine pulse width modulation wave generating circuit is connected to the active current loop regulator and the reactive current loop regulator, and is configured to receive the first modulation signal $u_{r1}$ from the active current loop regulator and the second modulation signal $u_{r2}$ from the reactive current loop regulator, generate a drive signal corresponding to the first and second modulation signals, and output the drive signal to the DC-AC converter.

According to another aspect of the present invention, a control system for a medium-voltage photovoltaic distribution system is provided. The medium-voltage photovoltaic distribution system includes: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1, wherein the control system comprises a DC-AC converter control circuit corresponding to the DC-AC converter, wherein the DC-AC converter control circuit comprises a bus voltage sampling circuit, an AC grid sampling and calculating circuit, an active power loop regulator, an amplitude limiting unit, a bus voltage loop regulator, an active current loop regulator, a reactive current loop regulator and a sine pulse width modulation wave generating circuit, wherein the bus voltage sampling circuit is configured to sample a bus voltage signal $U_{dc}$ of the DC bus;

the AC grid sampling and calculating circuit is configured to sample an AC voltage signal and an AC current signal output by the DC-AC converter, and calculate an active current signal $i_d$, a reactive current signal $i_q$ and an active power signal P based on the AC voltage signal and the AC current signal;

the active power loop regulator is connected to the AC grid sampling and calculating circuit, and is configured to receive a power difference signal obtained by subtracting the active power signal P from a predetermined active power reference signal $P_{ref}$ and output a voltage-regulating signal;

the amplitude limiting unit is connected to the active power loop regulator, and is configured to receive the voltage-regulating signal from the active power loop regulator and output a DC bus voltage reference signal $U_{dcref}$;

the bus voltage loop regulator is connected to the amplitude limiting unit and a bus voltage sampling circuit, and is configured to receive a voltage difference signal obtained by subtracting the bus voltage signal $U_{dc}$ from the DC bus voltage reference signal $U_{dcref}$ and output an active current reference signal $i_{dref}$;

the active current loop regulator is connected to the bus voltage loop regulator and the AC grid sampling and calculating circuit, and is configured to receive a first current difference signal obtained by subtracting the active current signal $i_d$ from the active current reference signal $i_{dref}$ and output a first modulation signal $u_{r1}$;

the reactive current loop regulator is connected to the AC grid sampling and calculating circuit, and is configured to receive a second current difference signal obtained by subtracting the reactive current signal $i_q$ from a predetermined reactive current reference signal $i_{qref}$ and output a second modulation signal $u_{r2}$; and the sine pulse width modulation wave generating circuit is connected to the active current loop regulator and the reactive current loop regulator, and is configured to receive the first modulation signal $u_{r1}$ from the active current loop regulator and the second modulation signal $u_{r2}$ from the reactive current loop regulator, generate a drive signal corresponding to the first modulation signal and the second modulation signal, and output the drive signal to the DC-AC converter.

As an example, a maximum fluctuation range of a DC bus voltage limited by the amplitude limiting unit has a highest value which is equal to a rated value of the DC bus voltage and a lowest value which is equal to a minimum value of the DC bus voltage.

According to yet another aspect of the present invention, a control method for a medium-voltage photovoltaic distribution system is provided. The medium-voltage photovoltaic distribution system includes: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1.

The control method includes:

performing following operations for any of the N DC-DC converters:

step S510: sampling a photovoltaic voltage signal $U_{PV}$ and a photovoltaic current signal $I_{PV}$ output by a photovoltaic module corresponding to the DC-DC converter, and sampling a bus voltage signal $U_{dc}$ of the DC bus;

step S520: receiving the bus voltage signal $U_{dc}$ and outputting a power weight coefficient $K_{MPPT}$ by a droop controller in a DC-DC converter control circuit corresponding to the DC-DC converter;

step S530: receiving the photovoltaic voltage signal $U_{PV}$, the photovoltaic current signal $I_{PV}$ and the power weight coefficient $K_{MPPT}$ and tracking a power point based on the photovoltaic voltage signal $U_{PV}$, the photovoltaic current signal $I_{PV}$ and the power weight coefficient $K_{MPPT}$ by a maximum power point tracking controller in the DC-DC converter control circuit, to obtain a photovoltaic input voltage reference signal $U_{PVref}$;

step S540: receiving a voltage difference signal obtained by subtracting the photovoltaic voltage signal $U_{PV}$ from the photovoltaic input voltage reference signal $U_{PVref}$, and outputting a modulation signal for the DC-DC converter by an input voltage loop regulator in the DC-DC converter control circuit; and step S550: receiving the modulation signal, generating a drive signal corresponding to the modulation signal, and outputting the drive signal to the DC-DC converter by a pulse width modulation wave generating circuit in the DC-DC converter control circuit.

As an example, the power weight coefficient $K_{MPPT}$ falls in a range of [0, 1], and if $K_{MPPT}=1$, the medium-voltage photovoltaic distribution system operates in a maximum power point tracking mode, and if $0 \leq K_{MPPT} < 1$, the medium-voltage photovoltaic distribution system operates in a power dispatching mode.

As an example, the control method also includes:

sampling an AC voltage signal and an AC current signal output by the DC-AC converter, and calculating an active current signal $i_d$, a reactive current signal $i_q$ and an active power signal P based on the AC voltage signal and the AC current signal;

receiving a power difference signal obtained by subtracting the active power signal P from a predetermined active power reference signal $P_{ref}$, and outputting a voltage-regulating signal by an active power loop regulator in a DC-AC converter control circuit corresponding to the DC-AC converter;

receiving the voltage-regulating signal and outputting a DC bus voltage reference signal $U_{dcref}$ by an amplitude limiting unit in the DC-AC converter control circuit;

receiving a voltage difference signal obtained by subtracting the bus voltage signal $U_{dc}$ from the DC bus voltage reference signal $U_{dcref}$ and outputting an active current reference signal $i_{dref}$ by a bus voltage loop regulator in the DC-AC converter control circuit;

receiving a first current difference signal obtained by subtracting the active current signal $i_d$ from the active current reference signal $i_{dref}$ and outputting a first modulation signal $u_{r1}$ by an active current loop regulator in the DC-AC converter control circuit;

receiving a second current difference signal obtained by subtracting the reactive current signal $i_q$ from a predetermined reactive current reference signal $i_{qref}$ and outputting a second modulation signal $u_{r2}$ by a reactive current loop regulator in the DC-AC converter control circuit;

receiving the first modulation signal $u_{r1}$ and the second modulation signal $u_{r2}$, generating a drive signal corresponding to the first modulation signal $u_{r1}$ and the second modulation signal $u_{r2}$, and outputting the drive signal to the DC-AC converter by a sine pulse width modulation wave generating circuit in the DC-AC converter control circuit.

According to yet another aspect of the present invention, a control method for a medium-voltage photovoltaic distribution system is provided. The medium-voltage photovoltaic distribution system includes: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1.

The control method includes:

step S610: sampling a bus voltage signal $U_{dc}$ of the DC bus;

step S620: sampling an AC voltage signal and an AC current signal output by the DC-AC converter, and calculating an active current signal $i_d$, a reactive current signal $i_q$ and an active power signal P based on the AC voltage signal and the AC current signal;

step S630: receiving a power difference signal obtained by subtracting the active power signal P from a predetermined active power reference signal $P_{ref}$, and outputting a voltage-regulating signal by an active power loop regulator in a DC-AC converter control circuit corresponding to the DC-AC converter;

step S640: receiving the voltage-regulating signal and outputting a DC bus voltage reference signal $U_{dcref}$ by an amplitude limiting unit in the DC-AC converter control circuit;

step S650: receiving a voltage difference signal obtained by subtracting the bus voltage signal $U_{dc}$ from the DC bus voltage reference signal $U_{dcref}$ and outputting an active current reference signal $i_{dref}$ by a bus voltage loop regulator in the DC-AC converter control circuit;

step S660: receiving a first current difference signal obtained by subtracting the active current signal $i_d$ from the active current reference signal $i_{dref}$ and outputting a first modulation signal $u_{r1}$ by an active current loop regulator in the DC-AC converter control circuit;

step S670: receiving a second current difference signal obtained by subtracting the reactive current signal $i_q$ from a predetermined reactive current reference signal $i_{qref}$ and outputting a second modulation signal $u_{r2}$ by a reactive current loop regulator in the DC-AC converter control circuit;

step S680: receiving the first modulation signal $i_{r1}$ and the second modulation signal $u_{r2}$, generating a drive signal corresponding to the first modulation signal $u_{r1}$ and the second modulation signal $u_{r2}$, and outputting the drive signal to the DC-AC converter by a sine pulse width modulation wave generating circuit in the DC-AC converter control circuit.

As an example, a maximum fluctuation range of a DC bus voltage limited by the amplitude limiting unit has a highest value which is equal to a rated value of the DC bus voltage and a lowest value which is equal to a minimum value of the DC bus voltage.

According to the control system and method for the medium-voltage photovoltaic distribution system according to the embodiments of the present invention, the DC bus voltage is used to replace a signal line for communication to implement the energy management for the DC-DC converters and/or the DC-AC converter. As such, the communication system can be greatly simplified, and the reliability of the control system can be improved.

BRIEF DESCRIPTION OF DRAWINGS

The above and other objects, features and advantages of the present invention will become more apparent by describing the embodiments in further detail in conjunction with the accompanying drawings. The accompanying drawings are provided for further understanding of the present invention and constitute a part of the description, together with the embodiments thereof, serve to explain the present invention, but do not constitute a limitation to the present invention. In the accompanying drawings, the same reference numerals usually denote the same components or steps.

DESCRIPTION OF EMBODIMENTS

Figure 1:
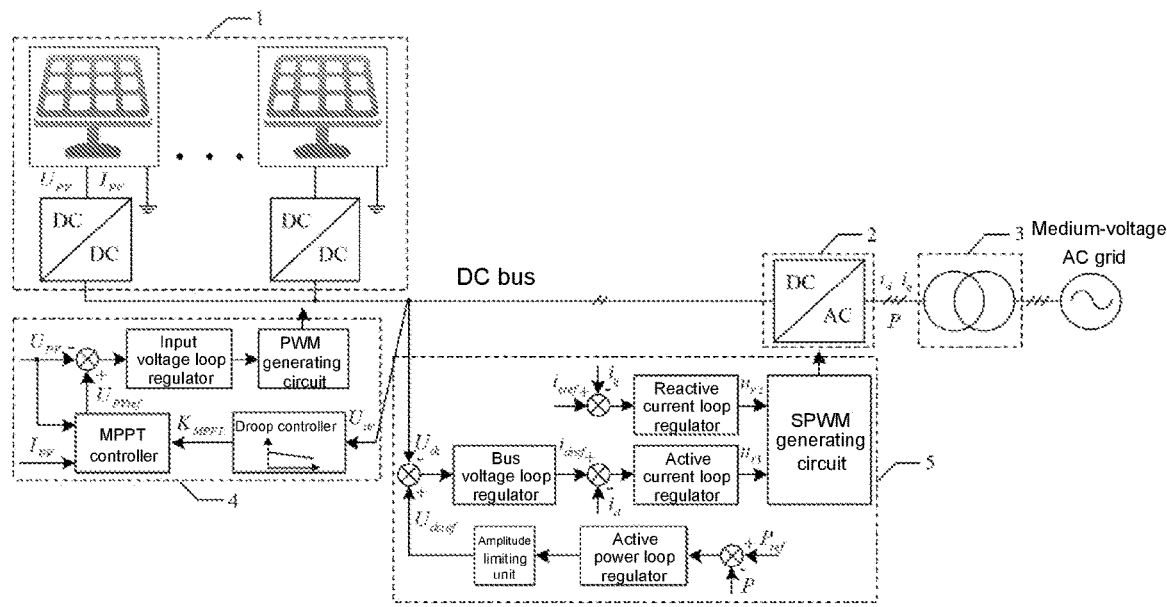
FIG. 1 illustrates a schematic diagram of a medium-voltage photovoltaic distribution system and a control system thereof according to an embodiment of the present invention.

To make the objectives, technical solutions and advantages of the present invention clearer, exemplary embodiments of the present invention will be described in detail below with reference to the accompanying drawings. It is obvious that the described embodiments are some of rather than all of the embodiments of the present invention. It should be understood that the present invention is not limited by the exemplary embodiments described herein. Based on the embodiments described in the present invention, all other embodiments obtained by those skilled in the art without any creative work should fall within the scope of protection of the present invention.

In order to at least partly solve the technical problems above, a control system and method for a medium-voltage photovoltaic distribution system are provided. The change of a DC bus voltage may indirectly reflect the change of energy. Therefore, the DC bus voltage may be used to replace the signal line for communication to implement the energy management for the DC-DC converters and/or the DC-AC converter. As such, the communication system can be greatly simplified, and the reliability of the control system can be improved.

According to one aspect of the present invention, a control system for a medium-voltage photovoltaic distribution system is provided. The medium-voltage photovoltaic distribution system includes: N photovoltaic modules, N DC-DC converters connected to the N photovoltaic modules respectively, a DC-AC converter and a line-frequency transformer connected to the DC-AC converter. Outputs of the N DC-DC converters are connected in parallel to a DC bus, and the DC bus is connected to the DC-AC converter. The line-frequency transformer is configured to connect to a medium-voltage AC grid. N is a natural number larger than or equal to 1.

The control system includes a bus voltage sampling circuit and N DC-DC converter control circuits corresponding to the N DC-DC converters respectively.

The bus voltage sampling circuit is configured to sample a bus voltage signal $U_{dc}$ of the DC bus.

Each DC-DC converter control circuit of the N DC-DC converter control circuits includes a bus voltage sampling circuit, a photovoltaic sampling circuit, a droop controller, a maximum power point tracking controller, an input voltage loop regulator and a pulse width modulation wave generating circuit.

The photovoltaic sampling circuit is configured to sample a photovoltaic voltage signal $U_{PV}$ and a photovoltaic current signal $I_{PV}$ output by a corresponding photovoltaic module.

The droop controller is connected to the bus voltage sampling circuit, and is configured to receive the bus voltage signal $U_{dc}$ from the bus voltage sampling circuit and output a power weight coefficient $K_{MPPT}$.

The maximum power point tracking controller is connected to the droop controller and the photovoltaic sampling circuit. The maximum power point tracking controller is configured to receive the photovoltaic voltage signal $U_{PV}$ and the photovoltaic current signal $I_{PV}$ from the photovoltaic sampling circuit, receive the power weight coefficient $K_{MPPT}$ from the droop controller, and track a power point based on the photovoltaic voltage signal $U_{PV}$, the photovoltaic current signal $I_{PV}$ and the power weight coefficient $K_{MPPT}$ to obtain a photovoltaic input voltage reference signal $U_{PVref}$.

The input voltage loop regulator is connected to the maximum power point tracking controller and the photovoltaic sampling circuit. The input voltage loop regulator is configured to receive a voltage difference signal obtained by subtracting the photovoltaic voltage signal $U_{PV}$ from the photovoltaic input voltage reference signal $U_{PVref}$, and output a modulation signal for a corresponding DC-DC converter.

The pulse width modulation wave generating circuit is connected to the input voltage loop regulator and the corresponding DC-DC converter. The pulse width modulation wave generating circuit is configured to receive the modulation signal from the input voltage loop regulator, generate a drive signal corresponding to the modulation signal, and output the drive signal to the corresponding DC-DC converter.

For the ease of understanding, the control system for the medium-voltage photovoltaic distribution system is described below with reference to FIG. 1. FIG. 1 illustrates a schematic diagram of a medium-voltage photovoltaic distribution system and a control system thereof according to an embodiment of the present invention. As illustrated in FIG. 1, the medium-voltage photovoltaic distribution system includes N photovoltaic modules and N DC-DC converters (in FIG. 1, the photovoltaic modules and the DC-DC converters are uniformly denoted by the reference number 1), a centralized DC-AC converter 2 and a line-frequency transformer 3. The control system may include N DC-DC converter control circuits 4 (only one DC-DC converter control circuit is illustrated by way of example in FIG. 1). There is a one-to-one correspondence between the N photovoltaic modules, the N DC-DC converters, and the N DC-DC converter control circuits, and each DC-DC converter control circuit controls the operation of a corresponding DC-DC converter of its own. The outputs of the N DC-DC converters are connected in parallel to the DC bus. The DC bus is connected to the centralized DC-AC converter 2. The DC- AC converter 2, the line-frequency transformer 3 and the medium-voltage AC grid are connected in sequence.

As illustrated in FIG. 1, each DC-DC converter control circuit 4 includes a droop controller, a maximum power point tracking controller (MPPT controller), an input voltage loop regulator and a pulse width modulation wave generating circuit (PWM generating circuit). The photovoltaic sampling circuit and the bus voltage sampling circuit are not illustrated in FIG. 1.

The bus voltage sampling circuit may be configured to sample a bus voltage signal $U_{dc}$ of the DC bus, and output the signal to each droop controller in the DC-DC converter control circuits.

The photovoltaic sampling circuit may be configured to sample a photovoltaic voltage signal $U_{PV}$ and a photovoltaic current signal $I_{PV}$ output by a corresponding photovoltaic module.

An input of each droop controller is connected to an output of the bus voltage sampling circuit, and an output of each droop controller is connected to an input of a corresponding MPPT controller. Each droop controller may run a droop control algorithm based on the bus voltage signal $U_{dc}$ and calculate a power weight coefficient $K_{MPPT}$. Those skilled in the art can understand the principle of the droop control algorithm, which will not be repeated herein.

An input of each MPPT controller is also connected to an output of a corresponding photovoltaic sampling circuit. In addition to receiving the power weight coefficient $K_{MPPT}$ output by the corresponding droop controller, each MPPT controller may also receive a photovoltaic voltage signal $U_{PV}$ and a photovoltaic current signal $I_{PV}$ output by the corresponding photovoltaic sampling circuit. Each MPPT controller may track a power point based on the received information, to find a position of an actual operating power point, and may output a photovoltaic input voltage reference signal $U_{PVref}$.

An input(s) of each input voltage loop regulator may be connected to an output of a corresponding MPPT controller and an output of a corresponding photovoltaic sampling circuit, directly or indirectly via a subtractor (a first subtractor). As illustrated in FIG. 1, a difference obtained by subtracting the photovoltaic voltage signal $U_{PV}$ from the photovoltaic input voltage reference signal $U_{PVref}$ may be input to the input voltage loop regulator to obtain a modulation signal for a corresponding DC-DC converter.

An input of each PWM generating circuit is connected to an output of a corresponding input voltage loop regulator. The modulation signal for the DC-DC converter may be input to the corresponding PWM generating circuit to obtain a drive signal for the DC-DC converter. Those skilled in the art may understand that the drive signal may control a duty cycle of a switch in the DC-DC converter to be changed, and then control the change of the operating state of the DC-DC converter.

In the control system for the medium-voltage photovoltaic distribution system according to an embodiment of the present invention, the DC bus voltage is used to replace the signal line for communication to implement the energy management for the DC-DC converters. As such, the communication system can be greatly simplified, and the reliability of the control system can be improved. In addition, the solution where the DC bus voltage droop control is used to obtain the power weight coefficient of each DC-DC converter may effectively implement the coordinated control of the medium-voltage photovoltaic distribution system.

As an example, the power weight coefficient $K_{MPPT}$ falls in the range of [0, 1]. If $K_{MPPT}=1$, the medium-voltage photovoltaic distribution system operates in a maximum power point tracking mode. If $0 \leq K_{MPPT} < 1$, the medium-voltage photovoltaic distribution system operates in a power dispatching mode.

As an example, the control system also includes a DC-AC converter control circuit corresponding to the DC-AC converter.

The DC-AC converter control circuit includes an AC grid sampling and calculating circuit, an active power loop regulator, an amplitude limiting unit, a bus voltage loop regulator, an active current loop regulator, a reactive current loop regulator and a sine pulse width modulation wave generating circuit.

The AC grid sampling and calculating circuit is configured to sample an AC voltage signal and an AC current signal output by the DC-AC converter, and calculate an active current signal $i_d$, a reactive current signal $i_q$ and an active power signal P based on the AC voltage signal and the AC current signal.

The active power loop regulator is connected to the AC grid sampling and calculating circuit, and is configured to receive a power difference signal obtained by subtracting the active power signal P from a predetermined active power reference signal $P_{ref}$ and output a voltage-regulating signal.

The amplitude limiting unit is connected to the active power loop regulator, and is configured to receive the voltage-regulating signal from the active power loop regulator, and output a DC bus voltage reference signal $U_{dcref}$.

The bus voltage loop regulator is connected to the amplitude limiting unit and the bus voltage sampling circuit, and is configured to receive a voltage difference signal obtained by subtracting the bus voltage signal $U_{dc}$ from the DC bus voltage reference signal $U_{dcref}$, and output an active current reference signal $i_{dref}$.

The active current loop regulator is connected to the bus voltage loop regulator and the AC grid sampling and calculating circuit, and is configured to receive a first current difference signal obtained by subtracting the active current signal $i_d$ from the active current reference signal $i_{dref}$ and output a first modulation signal $u_{r1}$.

The reactive current loop regulator is connected to the AC grid sampling and calculating circuit, and is configured to receive a second current difference signal obtained by subtracting the reactive current signal $i_q$ from a predetermined reactive current reference signal $i_{qref}$ and output a second modulation signal $u_{r2}$.

The sine pulse width modulation wave generating circuit is connected to the active current loop regulator and the reactive current loop regulator, and is configured to receive the first modulation signal $u_{r1}$ from the active current loop regulator and the second modulation signal $u_{r2}$ from the reactive current loop regulator, generate a drive signal corresponding to the first and second modulation signals, and output the drive signal to the DC-AC converter.

Still referring to FIG. 1, the control system as illustrated also includes a DC-AC converter control circuit 5. The DC-AC converter control circuit 5 may include an AC grid sampling and calculating circuit (not illustrated in FIG. 1), an active power loop regulator, an amplitude limiting unit, a bus voltage loop regulator, an active current loop regulator, a reactive current loop regulator and a sine pulse width modulation wave generating circuit (SPWM generating circuit).

The AC grid sampling and calculating circuit may be configured to sample an AC voltage signal and an AC current signal output by the DC-AC converter, and calculate an active current signal $i_d$, a reactive current signal $i_q$ and an active power signal P based on the AC voltage signal and the AC current signal.

An input of the active power loop regulator may be connected to an output of the AC grid sampling and calculating circuit, directly or indirectly via a subtractor (a second subtractor). A difference obtained by subtracting the active power signal P from the predetermined active power reference signal $P_{ref}$ may be then input to the active power loop regulator to obtain a voltage-regulating signal.

An input of the amplitude limiting unit is connected to an output of the active power loop regulator. The amplitude limiting unit may be used for limiting a DC bus voltage to be in a maximum fluctuation range. That is, the voltage-regulating signal output by the active power loop regulator may be shaped according to this maximum fluctuation range, so as to obtain a DC bus voltage reference signal $U_{dcref}$. Those skilled in the art can understand the operating principle of the amplitude limiting unit, which will not be described herein.

An input(s) of the bus voltage loop regulator may be connected to an output of the amplitude limiting unit and the output of the bus voltage sampling circuit, directly or indirectly via a subtractor (a third subtractor). A difference obtained by subtracting the bus voltage signal $U_{dc}$ from the DC bus voltage reference signal $U_{dcref}$ may be input to the bus voltage loop regulator to obtain an active current reference signal $i_{dref}$.

An input(s) of the active current loop regulator may be connected to an output of the bus voltage loop regulator and the output of the AC grid sampling and calculating circuit, directly or indirectly via a subtractor (a fourth subtractor). A difference obtained by subtracting an active current signal $i_d$ from the active current reference signal $i_{dref}$ can be then input into the active current loop regulator to obtain a first modulation signal $u_{r1}$ for the DC-AC converter.

An input of the reactive current loop regulator may be connected to the output of the AC grid sampling and calculating circuit, directly or indirectly via a subtractor (a fifth subtractor). A difference obtained by subtracting a reactive current signal $i_q$ from the predetermined reactive current reference signal $i_{qref}$ can be then input to the reactive current loop regulator to obtain a second modulation signal $u_{r2}$ for the DC-AC converter.

Inputs of the SPWM generating circuit may be connected to an output of the active current loop regulator and an output of the reactive current loop regulator. The first modulation signal $u_{r1}$ and the second modulation signal $u_{r2}$ for the above DC-AC converter may be input to the SPWM generating circuit to obtain a drive signal for the DC-AC converter. Those skilled in the art may understand that the drive signal may control a duty cycle of a switch in the DC-AC converter to be changed, and then control the change of the operating state of the DC-AC converter.

According to the above embodiment, the DC bus voltage is used to replace the signal line for communication to implement the energy management for the DC-DC converters and the DC-AC converter. As such, the communication system can be further simplified, and the reliability of the control system can be improved.

As an example, the maximum fluctuation range of the DC bus voltage limited by the amplitude limiting unit has a highest value which is equal to a rated value of the DC bus voltage and a lowest value which is equal to a minimum value of the DC bus voltage.

Figure 2:
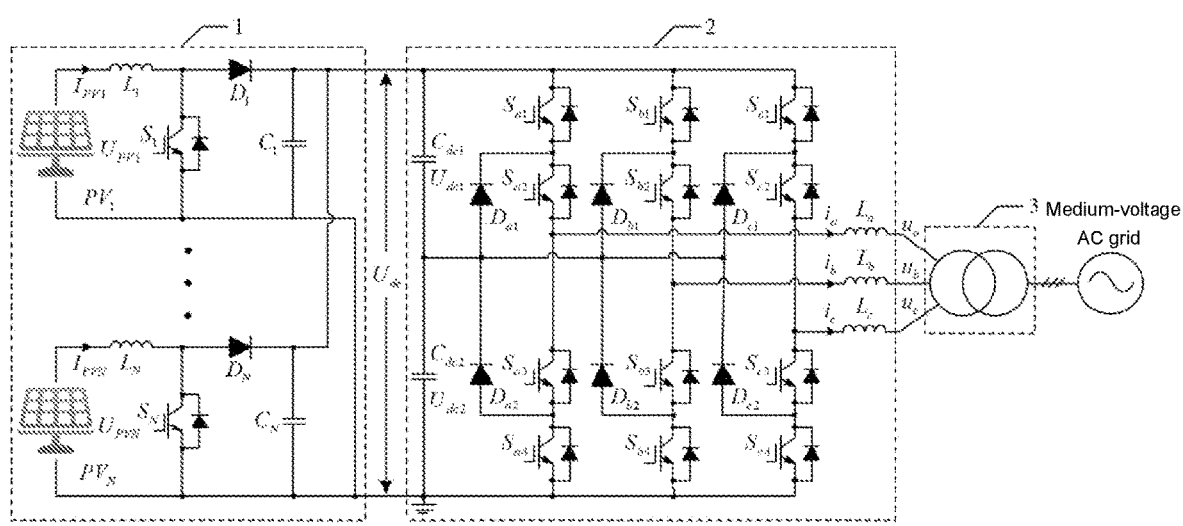
FIG. 2 illustrates a schematic diagram of a Boost DC-DC converter topology and a neutral point clamped three-level DC-AC converter topology as employed according to an embodiment of the present invention.

In a specific embodiment, both the DC-DC converters and the DC-AC converter may employ multiple circuit topologies. FIG. 2 illustrates a schematic diagram of a Boost DC-DC converter topology and a neutral point clamped three-level DC-AC converter topology as employed according to an embodiment of the present invention.

Figure 3:
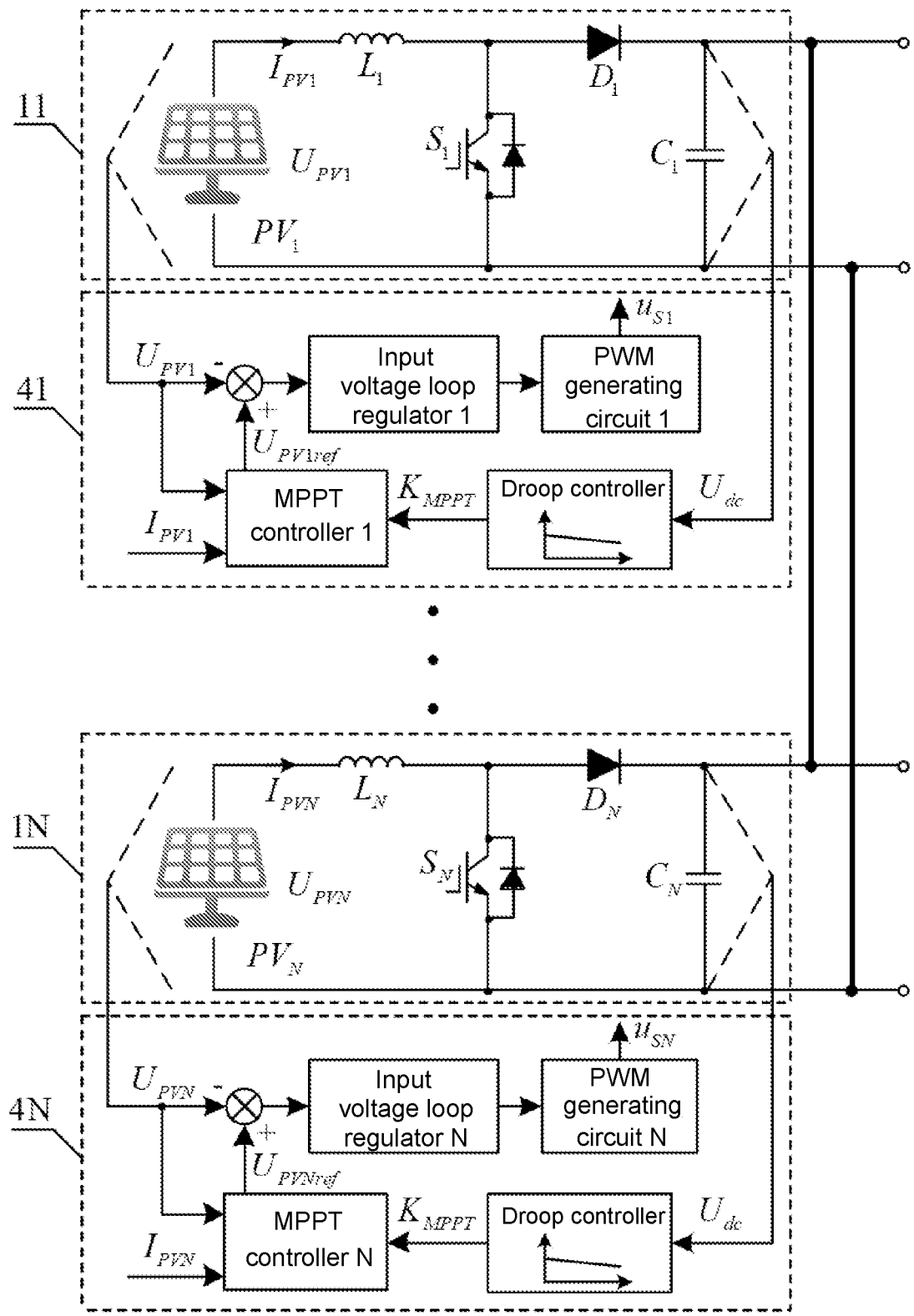
FIG. 3 illustrates a schematic diagram of a circuit topology of N Boost DC-DC converters operating in parallel and DC-DC converter control circuits according to an embodiment of the present invention.

FIG. 3 illustrates a schematic diagram of a circuit topology of N Boost DC-DC converters operating in parallel and DC-DC converter control circuits according to an embodiment of the present invention, where photovoltaic modules, DC-DC converters 11-1N and DC-DC converter control circuits 41-4N are included. Assuming that N is 100, the maximum output power for each group of photovoltaic module and DC-DC converter is 10 kW, and the maximum output power of the medium-voltage photovoltaic distribution system is 1 MW. If the predetermined active power reference signal $P_{ref}$ is 1 MW, by regulating the DC bus voltage $U_{dc}$ in the control system, the power weight coefficients $K_{MPPT}$ obtained by the droop controllers are 1. The maximum output power of each group of photovoltaic module and DC-DC converter is then 10 kW, and the medium-voltage photovoltaic distribution system operates in an MPPT mode. If the predetermined active power reference signal $P_{ref}$ is 0.7 MW, by regulating the DC bus voltage $U_{dc}$ in the control system, the power weight coefficients $K_{MPPT}$ obtained by the droop controllers are 0.7. The output power of each group of photovoltaic module and DC-DC converter is 7 kW, and the medium-voltage photovoltaic distribution system operates in a power dispatching mode. If the predetermined active power reference signal $P_{ref}$ is 0.7 MW and the maximum output power of a photovoltaic module is 5 kW due to partial shading, the power weight coefficient is regulated to be 0.7035 in the control system. Then, the output power of the group of normal photovoltaic module and a corresponding DC-DC converter is 7.035 kW, and the output power of the group of the partial-shaded photovoltaic module and the corresponding DC-DC converter is 3.518 kW. The medium-voltage photovoltaic distribution system still operates in the power dispatching mode. From this, it can be seen that by regulating the power weight coefficient based on the change of the DC bus voltage signal, the energy dispatching and management for the respective DC-DC converters can be realized, and the smooth switching between the two operating modes of MPPT and power dispatching can also be realized.

Figure 4:
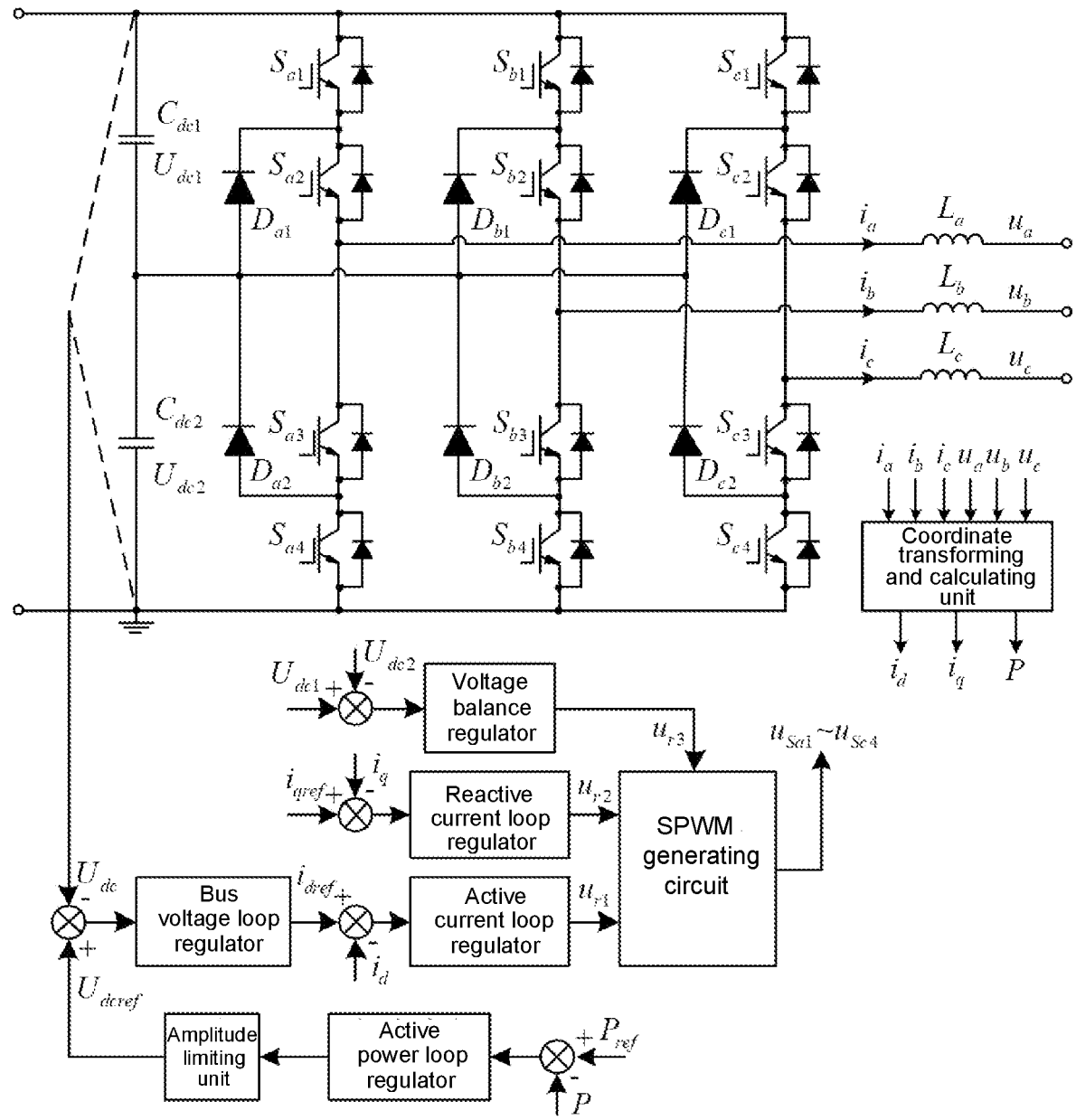
FIG. 4 illustrates a schematic diagram of a circuit topology of a neutral point clamped three-level DC-AC converter and a DC-AC converter control circuit according to an embodiment of the present invention.

FIG. 4 illustrates a schematic diagram of a circuit topology of a neutral point clamped three-level DC-AC converter and a DC-AC converter control circuit according to an embodiment of the present invention. First, three-phase AC voltage signals $u_a$, $u_b$, $u_c$ and three-phase AC current signals $i_a$, $i_b$, $i_c$ may be sampled, and then an active current signal $i_d$, a reactive current signal $i_q$ and an active power signal P are obtained via a coordinate transforming and calculating unit (an AC grid sampling and calculating circuit may include a sampling unit and the coordinate transforming and calculating unit). A difference is obtained by subtracting an active power signal P from a predetermined active power reference signal $P_{ref}$ and then processed by an active power loop regulator and an amplitude limiting unit to obtain a DC bus voltage reference signal $U_{dcref}$. A difference obtained by subtracting a bus voltage signal $U_{dc}$ from the DC bus voltage reference signal $U_{dcref}$ is then processed by the bus voltage loop regulator to obtain an active current reference signal $i_{dref}$. A difference is obtained by subtracting the active current signal $i_d$ from the active current reference signal $i_{dref}$ and then processed by an active current loop regulator to obtain a first modulation signal $u_{r1}$. A difference is obtained by subtracting the reactive current signal $i_q$ from a predetermined reactive current reference signal $i_{qref}$ and then processed by a reactive current loop regulator to obtain a second modulation signal $u_{r2}$. Optionally, there are a voltage signal $U_{dc1}$ and a voltage signal $U_{dc2}$ from two split-capacitors on the DC bus. A difference may be obtained by subtracting the voltage signal $U_{dc2}$ from the voltage signal $U_{dc1}$, and then processed by a voltage balance regulator to obtain a third modulation signal $u_{r3}$. The first to third modulation signals $u_{r1}$, $u_{r2}$, $u_{r3}$ may be input to an SPWM generating circuit to obtain drive signals $u_{Sa1}$-$u_{Sc4}$ for power switches of the neutral point clamped three-level DC-AC converter. In the active power control loop, the output of the amplitude limiting unit is taken as a reference value of the DC bus voltage loop, so the DC bus voltage is limited within the maximum fluctuation range.

According to another aspect of the present invention, a control system for a medium-voltage photovoltaic distribution system is provided. The medium-voltage photovoltaic distribution system includes N photovoltaic modules, N DC-DC converters connected to the N photovoltaic modules respectively, a DC-AC converter and a line-frequency transformer connected to the DC-AC converter. Output of the N DC-DC converters are connected in parallel to a DC bus. The DC bus is connected to the DC-AC converter. The line-frequency transformer is configured to connect to the medium-voltage AC grid. N is a natural number larger than or equal to 1.

The control system includes a DC-AC converter control circuit corresponding to the DC-AC converter.

The DC-AC converter control circuit includes a bus voltage sampling circuit, an AC grid sampling and calculating circuit, an active power loop regulator, an amplitude limiting unit, a bus voltage loop regulator, an active current loop regulator, a reactive current loop regulator and a sine pulse width modulation wave generating circuit.

The bus voltage sampling circuit is configured to sample a bus voltage signal $U_{dc}$ of the DC bus.

The AC grid sampling and calculating circuit is configured to sample an AC voltage signal and an AC current signal output by the DC-AC converter, and calculate an active current signal $i_d$, a reactive current signal $i_q$ and an active power signal P based on the AC voltage signal and the AC current signal.

The active power loop regulator is connected to the AC grid sampling and calculating circuit, and is configured to receive a power difference signal obtained by subtracting the active power signal P from a predetermined active power reference signal $P_{ref}$ and output a voltage-regulating signal.

The amplitude limiting unit is connected to the active power loop regulator, and is configured to receive the voltage-regulating signal from the active power loop regulator, and output a DC bus voltage reference signal $U_{dcref}$.

The bus voltage loop regulator is connected to the amplitude limiting unit and the bus voltage sampling circuit, and is configured to receive a voltage difference signal obtained by subtracting the bus voltage signal $U_{dc}$ from the DC bus voltage reference signal $U_{dcref}$ and output an active current reference signal $i_{dref}$.

The active current loop regulator is connected to the bus voltage loop regulator and the AC grid sampling and calculating circuit, and is configured to receive a first current difference signal obtained by subtracting the active current signal $i_d$ from the active current reference signal $i_{dref}$ and output a first modulation signal $u_{r1}$.

The reactive current loop regulator is connected to the AC grid sampling and calculating circuit, and is configured to receive a second current difference signal obtained by subtracting the reactive current signal $i_q$ from a predetermined reactive current reference signal $i_{qref}$ and output a second modulation signal $u_{r2}$.

The sine pulse width modulation wave generating circuit is connected to the active current loop regulator and the reactive current loop regulator, and is configured to receive the first modulation signal $u_{r1}$ from the active current loop regulator and the second modulation signal $u_{r2}$ from the reactive current loop regulator, generate a drive signal corresponding to the first and second modulation signals, and output the drive signal to the DC-AC converter.

The structure and operating principle of the DC-AC converter control circuit have been described above, which will not be repeated here.

According to the above embodiments, the DC bus voltage is used to replace the signal line for communication to implement the energy management for the DC-AC converter. As such, the communication system can be simplified, and the reliability of the control system can be improved.

As an example, a maximum fluctuation range of a DC bus voltage limited by the amplitude limiting unit has a highest value which is equal to a rated value of the DC bus voltage and a lowest value which is equal to a minimum value of the DC bus voltage.

Figure 5:
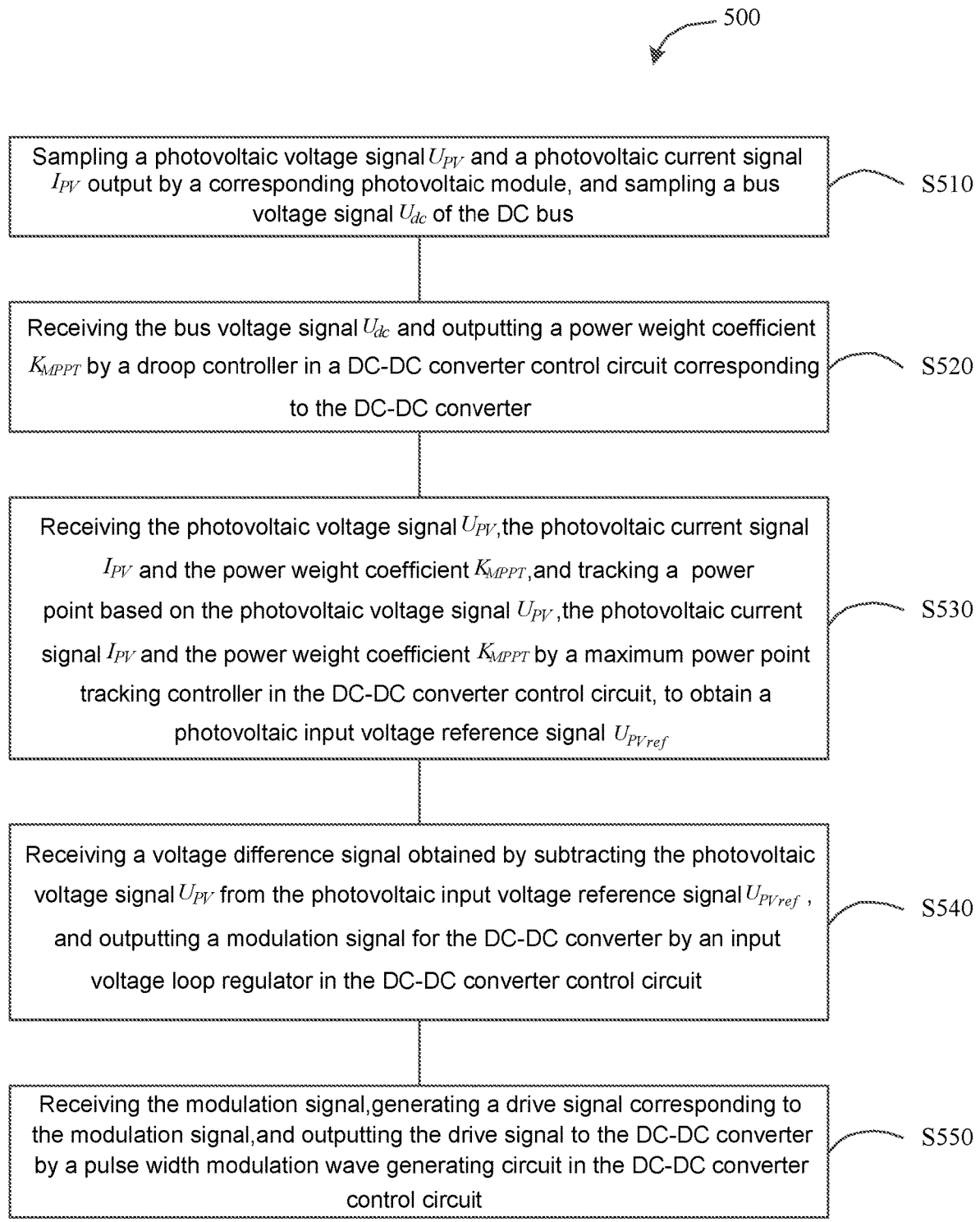
FIG. 5 illustrates a schematic diagram of operation steps of a control method for a medium-voltage photovoltaic distribution system according to an embodiment of the present invention.

According to another aspect of the present invention, a control method for a medium-voltage photovoltaic distribution system is provided. FIG. 5 illustrates a schematic diagram of operation steps of a control method 500 for a medium-voltage photovoltaic distribution system according to an embodiment of the present invention. The control method for the medium-voltage photovoltaic distribution system is described below with reference to FIG. 5.

The medium-voltage photovoltaic distribution system includes: N photovoltaic modules, N DC-DC converters connected to the N photovoltaic modules respectively, a DC-AC converter and a line-frequency transformer connected to the DC-AC converter. Outputs of the N DC-DC converters are connected in parallel to a DC bus. The DC bus is connected to the DC-AC converter. The line-frequency transformer is configured to connect to the medium-voltage AC grid. N is a natural number larger than or equal to 1.

The control method 500 includes following operations for any one of the N DC-DC converters.

At step S510, a photovoltaic voltage signal $U_{PV}$ and a photovoltaic current signal $I_{PV}$ output by a photovoltaic module corresponding to the DC-DC converter are sampled, and a bus voltage signal $U_{dc}$ of the DC bus is sampled.

At step S520, the bus voltage signal $U_{dc}$ is received by a droop controller in a DC-DC converter control circuit corresponding to the DC-DC converter, and a power weight coefficient $K_{MPPT}$ is output by the droop controller.

At step S530, the photovoltaic voltage signal $U_{PV}$, the photovoltaic current signal $I_{PV}$ and the power weight coefficient $K_{MPPT}$ are received by a maximum power point tracking controller in the DC-DC converter control circuit, and a power point is tracked based on the photovoltaic voltage signal $U_{PV}$, the photovoltaic current signal $I_{PV}$ and the power weight coefficient $K_{MPPT}$ by the maximum power point tracking controller, to obtain a photovoltaic input voltage reference signal $U_{PVref}$.

At step S540, a voltage difference signal which is obtained by subtracting the photovoltaic voltage signal $U_{PV}$ from the photovoltaic input voltage reference signal $U_{PVref}$ is received by an input voltage loop regulator in the DC-DC converter control circuit, and a modulation signal for the DC-DC converter is output by the input voltage loop regulator.

At step S550, the modulation signal is received by a pulse width modulation wave generating circuit in the DC-DC converter control circuit, and a drive signal corresponding to the modulation signal is generated and output to the DC-DC converter by the pulse width modulation wave generating circuit.

As an example, the power weight coefficient $K_{MPPT}$ falls in a range of [0, 1].

If $K_{MPPT}=1$, the medium-voltage photovoltaic distribution system operates in a maximum power point tracking mode. If $0 \leq K_{MPPT} \leq 1$, the medium-voltage photovoltaic distribution system operates in a power dispatching mode.

As an example, the control method 500 may further include following steps.

An AC voltage signal and an AC current signal output by the DC-AC converter are sampled, and an active current signal $i_d$, a reactive current signal $i_q$ and an active power signal P are calculated based on the AC voltage signal and the AC current signal.

A power difference signal which is obtained by subtracting the active power signal P from a predetermined active power reference signal $P_{ref}$ is received by an active power loop regulator in a DC-AC converter control circuit corresponding to the DC-AC converter, and a voltage-regulating signal is output by the active power loop regulator.

The voltage-regulating signal is received by an amplitude limiting unit in the DC-AC converter control circuit, and output a DC bus voltage reference signal $U_{dcref}$ is output by the amplitude limiting unit.

A voltage difference signal which is obtained by subtracting the bus voltage signal $U_{dc}$ from the DC bus voltage reference signal $U_{dcref}$ is received by a bus voltage loop regulator in the DC-AC converter control circuit, and an active current reference signal $U_{dcref}$ is output by the bus voltage loop regulator.

A first current difference signal which is obtained by subtracting the active current signal $i_d$ from the active current reference signal $i_{dref}$ is received by an active current loop regulator in the DC-AC converter control circuit, and a first modulation signal $u_{r1}$ is output by the active current loop regulator.

A second current difference signal which is obtained by subtracting the reactive current signal $i_q$ from a predetermined reactive current reference signal $i_{qref}$ is received by a reactive current loop regulator in the DC-AC converter control circuit, and a second modulation signal $u_{r2}$ is output by the reactive current loop regulator.

The first modulation signal $u_{r1}$ and the second modulation signal $u_{r2}$ is received by a sine pulse width modulation wave generating circuit in the DC-AC converter control circuit, and a drive signal corresponding to the modulation signals is generated and output to the DC-AC converter by the sine pulse width modulation wave generating circuit.

Figure 6:
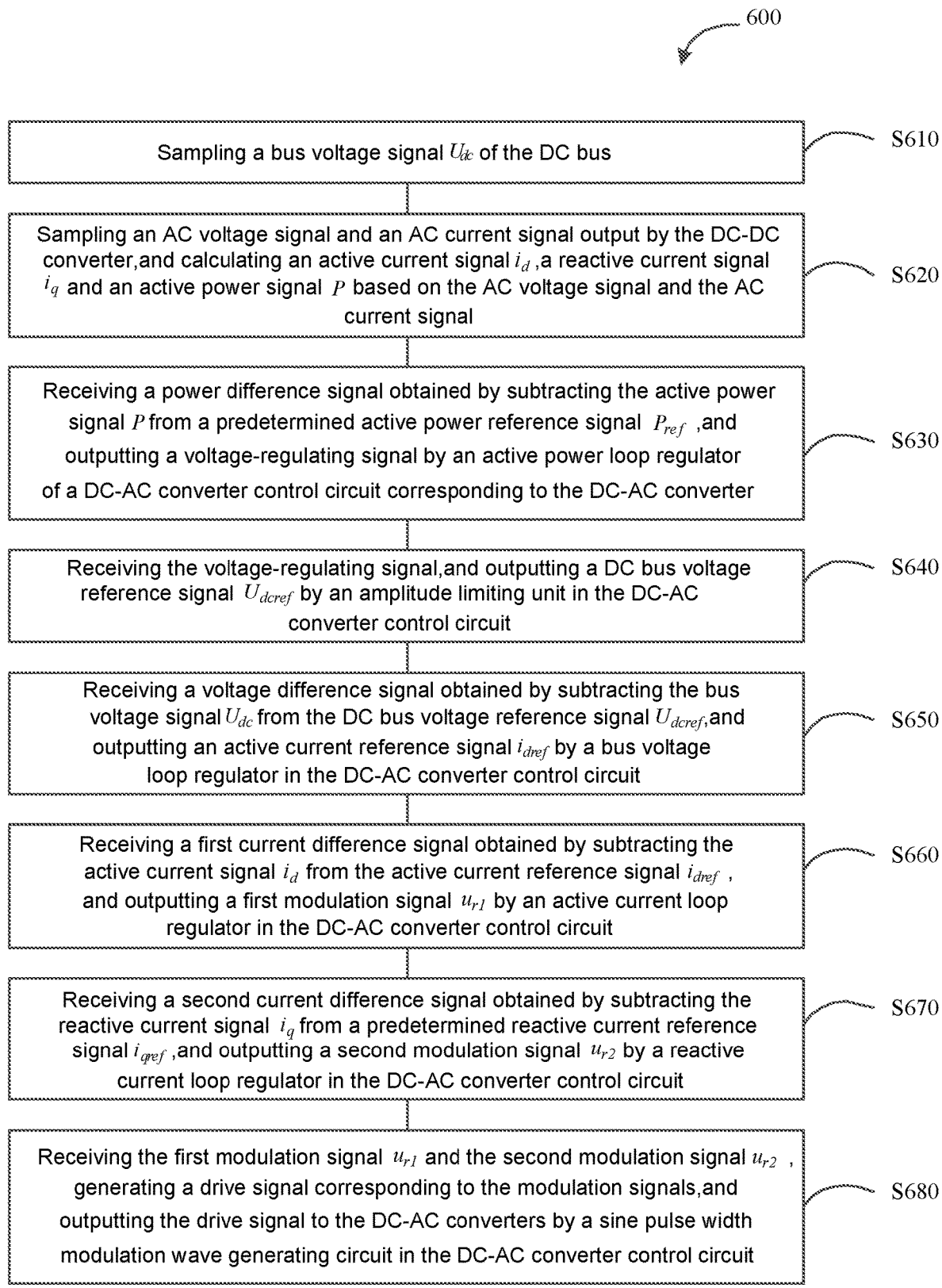
FIG. 6 illustrates a schematic diagram of operation steps of a control method for a medium-voltage photovoltaic distribution system according to another embodiment of the present invention.

According to another aspect of the present invention, a control method for a medium-voltage photovoltaic distribution system is provided. FIG. 6 illustrates a schematic diagram of operation steps of a control method 600 for a medium-voltage photovoltaic distribution system according to an embodiment of the present invention. The control method for the medium-voltage photovoltaic distribution system is described below with reference to FIG. 6.

The medium-voltage photovoltaic distribution system includes: N photovoltaic modules, N DC-DC converters connected to the N photovoltaic modules respectively, a DC-AC converter and a line-frequency transformer connected to the DC-AC converter. Outputs of the N DC-DC converters are connected in parallel to a DC bus. The DC bus is connected to the DC-AC converter. The line-frequency transformer is configured to connect to a medium-voltage AC grid. N is a natural number larger than or equal to 1.

The control method includes following steps.

At step S610, a bus voltage signal $U_{dc}$ of the DC bus is sampled.

At step S620, an AC voltage signal and an AC current signal output by the DC-AC converter are sampled, and an active current signal $i_d$, a reactive current signal $i_q$ and an active power signal P are calculated based on the AC voltage signal and the AC current signal.

At step S630, a power difference signal which is obtained by subtracting the active power signal P from a predetermined active power reference signal $P_{ref}$ is received by an active power loop regulator in a DC-AC converter control circuit corresponding to the DC-AC converter, and a voltage-regulating signal is output by the active power loop regulator.

At step S640, the voltage-regulating signal is received by an amplitude limiting unit in the DC-AC converter control circuit, and a DC bus voltage reference signal $U_{dcref}$ is output by the amplitude limiting unit.

At step S650, a voltage difference signal which is obtained by subtracting the bus voltage signal $U_{dc}$ from the DC bus voltage reference signal $U_{dcref}$ is received by a bus voltage loop regulator in the DC-AC converter control circuit, and an active current reference signal $i_{dref}$ is output by the bus voltage loop regulator.

At step S660, a first current difference signal which is obtained by subtracting the active current signal $i_d$ from the active current reference signal $i_{dref}$ is received by active current loop regulator in the DC-AC converter control circuit, and a first modulation signal $u_{r1}$ is output by the active current loop regulator.

At step S670, a second current difference signal which is obtained by subtracting the reactive current signal $i_q$ from a predetermined reactive current reference signal $i_{qref}$ is received by a reactive current loop regulator in the DC-AC converter control circuit, and a second modulation signal $u_{r2}$ is output by the reactive current loop regulator.

At step S680, The first modulation signal $u_{r1}$ and the second modulation signal $u_{r2}$ are received by a sine pulse width modulation wave generating circuit in the DC-AC converter control circuit, and a drive signal corresponding to the modulation signals is generated and output to the DC-AC converter by the sine pulse width modulation wave generating circuit.

As an example, a maximum fluctuation range of a DC bus voltage limited by the amplitude limiting unit has a highest value which is equal to a rated value of the DC bus voltage and a lowest value which is equal to a minimum value of the DC bus voltage.

In several embodiments provided by the present application, it should be understood that the disclosed devices and methods may be implemented by other means. For example, the device embodiments described above are merely schematic. For example, the partitioning of the units may be a logical functional partitioning. There may be other partitioning modes during actual implementation. For example, multiple units or components may be combined or integrated into another device, or some features may be ignored or not executed.

The various component embodiments of the present invention may be implemented by hardware, or by software modules running on one or more processors, or by a combination of them. Those skilled in the art should understand that a microprocessor or a digital signal processor (DSP) may be used in practice to implement some or all of the functions of some modules in the control system for the medium-voltage photovoltaic distribution system according to the embodiments of the present invention. The present invention can also be implemented as a program (for example, a computer program and a computer program product) for executing part or all of the methods described herein. Such a program for realizing the present invention may be stored on a computer-readable medium, or may be in a form of one or more signals. Such signals can be downloaded from Internet websites, or provided on carriers, or provided in any other form.

It should be noted that the above embodiments are provided for illustration of the present invention and are not intended to limit the present invention and those skilled in the art may design alternative embodiments without departing from the scope defined by the appended claims. In the claims, any reference sign between brackets should not be construed as limiting the claims. The word "comprise" does not exclude the presence of other elements or steps which are not listed in the claims. The word "an" or "a" preceding an element does not exclude the presence of a plurality of such elements. The present invention may be implemented by means of hardware including several different elements and by means of an appropriately programmed computer. In device claims listing several means, several of these means may be specifically implemented by a same hardware. Use of the words such as "first", "second", "third" and the like does not indicate any ordering, and these words may be interpreted as names.

The above description is merely a specific implementation of the present invention or is description of the specific implementation of the present invention, but the protection scope of the present invention is not limited to this. Any changes or replacements that would be readily conceived by any person skilled in the art within the technical scope disclosed in the present invention should be within the protection scope of the present invention. The protection scope of the present invention shall be subject to the protection scope defined by the claims.

What is claimed is:

1. A control system for a medium-voltage photovoltaic distribution system, the medium-voltage photovoltaic distribution system comprising: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1, the control system being characterized in that:

the control system comprises a bus voltage sampling circuit and N DC-DC converter control circuits corresponding to the N DC-DC converters respectively, wherein the bus voltage sampling circuit is configured to sample a bus voltage signal $U_{dc}$ of the DC bus;

each DC-DC converter control circuit of the N DC-DC converter control circuits comprises a bus voltage sampling circuit, a photovoltaic sampling circuit, a droop controller, a maximum power point tracking controller, an input voltage loop regulator and a pulse width modulation wave generating circuit;

the photovoltaic sampling circuit is configured to sample a photovoltaic voltage signal $U_{PV}$ and a photovoltaic current signal $I_{PV}$ output by a corresponding photovoltaic module;

the droop controller is connected to the bus voltage sampling circuit, and is configured to receive the bus voltage signal $U_{dc}$ from the bus voltage sampling circuit and output a power weight coefficient $K_{MPPT}$;

the maximum power point tracking controller is connected to the droop controller and the photovoltaic sampling circuit, and is configured to receive the photovoltaic voltage signal $U_{PV}$ and the photovoltaic current signal $I_{PV}$ from the photovoltaic sampling circuit, receive the power weight coefficient $K_{MPPT}$ from the droop controller, and track a power point based on the photovoltaic voltage signal $U_{PV}$, the photovoltaic current signal $I_{PV}$ and the power weight coefficient $K_{MPPT}$ to obtain a photovoltaic input voltage reference signal $U_{PVref}$;

the input voltage loop regulator is connected to the maximum power point tracking controller and the photovoltaic sampling circuit, and is configured to receive a voltage difference signal obtained by subtracting the photovoltaic voltage signal $U_{PV}$ from the photovoltaic input voltage reference signal $U_{PVref}$ and output a modulation signal for a corresponding DC-DC converter; and the pulse width modulation wave generating circuit is connected to the input voltage loop regulator and the corresponding DC-DC converter, and is configured to receive the modulation signal from the input voltage loop regulator, generate a drive signal corresponding to the modulation signal, and output the drive signal to the corresponding DC-DC converter.

2. The control system according to claim 1, wherein the power weight coefficient $K_{MPPT}$ falls in a range of [0, 1]; and if $K_{MPPT}=1$, the medium-voltage photovoltaic distribution system operates in a maximum power point tracking mode; and if $0 \leq K_{MPPT} < 1$, the medium-voltage photovoltaic distribution system operates in a power dispatching mode.

3. The control system according to claim 1, wherein the control system further comprises a DC-AC converter control circuit corresponding to the DC-AC converter, wherein the DC-AC converter control circuit comprises an AC grid sampling and calculating circuit, an active power loop regulator, an amplitude limiting unit, a bus voltage loop regulator, an active current loop regulator, a reactive current loop regulator and a sine pulse width modulation wave generating circuit, wherein the AC grid sampling and calculating circuit is configured to sample an AC voltage signal and an AC current signal output by the DC-AC converter, and calculate an active current signal $i_d$, a reactive current signal $i_q$ and an active power signal P based on the AC voltage signal and the AC current signal;

the active power loop regulator is connected to the AC grid sampling and calculating circuit, and is configured to receive a power difference signal obtained by subtracting the active power signal P from a predetermined active power reference signal $P_{ref}$ and output a voltage-regulating signal;

the amplitude limiting unit is connected to the active power loop regulator, and is configured to receive the voltage-regulating signal from the active power loop regulator and output a DC bus voltage reference signal $U_{dcref}$;

the bus voltage loop regulator is connected to the amplitude limiting unit and the bus voltage sampling circuit, and is configured to receive a voltage difference signal obtained by subtracting the bus voltage signal $U_{dc}$ from the DC bus voltage reference signal $U_{dcref}$ and output an active current reference signal $i_{dref}$;

the active current loop regulator is connected to the bus voltage loop regulator and the AC grid sampling and calculating circuit, and is configured to receive a first current difference signal obtained by subtracting the active current signal $i_d$ from the active current reference signal $i_{dref}$ and output a first modulation signal $u_{r1}$;

the reactive current loop regulator is connected to the AC grid sampling and calculating circuit, and is configured to receive a second current difference signal obtained by subtracting the reactive current signal $i_q$ from a predetermined reactive current reference signal $i_{qref}$ and output a second modulation signal $u_{r2}$; and the sine pulse width modulation wave generating circuit is connected to the active current loop regulator and the reactive current loop regulator, and is configured to receive the first modulation signal $u_{r1}$ from the active current loop regulator and the second modulation signal $u_{r2}$ from the reactive current loop regulator, generate a drive signal corresponding to the first modulation signal and the second modulation signal, and output the drive signal to the DC-AC converter.

4. A control system for a medium-voltage photovoltaic distribution system, the medium-voltage photovoltaic distribution system comprising: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1, wherein the control system comprises a DC-AC converter control circuit corresponding to the DC-AC converter, wherein the DC-AC converter control circuit comprises a bus voltage sampling circuit, an AC grid sampling and calculating circuit, an active power loop regulator, an amplitude limiting unit, a bus voltage loop regulator, an active current loop regulator, a reactive current loop regulator and a sine pulse width modulation wave generating circuit, wherein the bus voltage sampling circuit is configured to sample a bus voltage signal $U_{dc}$ of the DC bus;

the AC grid sampling and calculating circuit is configured to sample an AC voltage signal and an AC current signal output by the DC-AC converter, and calculate an active current signal $i_d$, a reactive current signal $i_q$ and an active power signal P based on the AC voltage signal and the AC current signal;

the active power loop regulator is connected to the AC grid sampling and calculating circuit, and is configured to receive a power difference signal obtained by subtracting the active power signal P from a predetermined active power reference signal $P_{ref}$ and output a voltage-regulating signal; the amplitude limiting unit is connected to the active power loop regulator, and is configured to receive the voltage-regulating signal from the active power loop regulator and output a DC bus voltage reference signal $U_{dcref}$;

the bus voltage loop regulator is connected to the amplitude limiting unit and a bus voltage sampling circuit, and is configured to receive a voltage difference signal obtained by subtracting the bus voltage signal $U_{dc}$ from the DC bus voltage reference signal $U_{dcref}$ and output an active current reference signal $i_{dref}$;

the active current loop regulator is connected to the bus voltage loop regulator and the AC grid sampling and calculating circuit, and is configured to receive a first current difference signal obtained by subtracting the active current signal $i_d$ from the active current reference signal $i_{dref}$ and output a first modulation signal $u_{r1}$;

the reactive current loop regulator is connected to the AC grid sampling and calculating circuit, and is configured to receive a second current difference signal obtained by subtracting the reactive current signal $i_q$ from a predetermined reactive current reference signal $i_{qref}$ and output a second modulation signal $u_{r2}$; and the sine pulse width modulation wave generating circuit is connected to the active current loop regulator and the reactive current loop regulator, and is configured to receive the first modulation signal $u_{r1}$ from the active current loop regulator and the second modulation signal $u_{r2}$ from the reactive current loop regulator, generate a drive signal corresponding to the first modulation signal and the second modulation signal, and output the drive signal to the DC-AC converter.

5. The control system according to claim 4, wherein a maximum fluctuation range of a DC bus voltage limited by the amplitude limiting unit has a highest value which is equal to a rated value of the DC bus voltage and a lowest value which is equal to a minimum value of the DC bus voltage.

6. A control method for a medium-voltage photovoltaic distribution system, the medium-voltage photovoltaic distribution system comprising: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1, wherein the control method comprises:

performing the following operations for any of the N DC-DC converters:

step S510: sampling a photovoltaic voltage signal $U_{PV}$ and a photovoltaic current signal $I_{PV}$ output by a photovoltaic module corresponding to the DC-DC converter, and sampling a bus voltage signal $U_{dc}$ of the DC bus;

step S520: receiving the bus voltage signal $U_{dc}$ and outputting a power weight coefficient $K_{MPPT}$ by a droop controller in a DC-DC converter control circuit corresponding to the DC-DC converter;

step S530: receiving the photovoltaic voltage signal $U_{PV}$, the photovoltaic current signal $I_{PV}$ and the power weight coefficient $K_{MPPT}$ and tracking a power point based on the photovoltaic voltage signal $U_{PV}$, the photovoltaic current signal $I_{PV}$ and the power weight coefficient $K_{MPPT}$ by a maximum power point tracking controller in the DC-DC converter control circuit, to obtain a photovoltaic input voltage reference signal $U_{PVref}$;

step S540: receiving a voltage difference signal obtained by subtracting the photovoltaic voltage signal $U_{PV}$ from the photovoltaic input voltage reference signal $U_{PVref}$, and outputting a modulation signal for the DC-DC converter by an input voltage loop regulator in the DC-DC converter control circuit; and step S550: receiving the modulation signal, generating a drive signal corresponding to the modulation signal, and outputting the drive signal to the DC-DC converter by a pulse width modulation wave generating circuit in the DC-DC converter control circuit.

7. The control method according to claim 6, wherein the power weight coefficient $K_{MPPT}$ falls in a range of [0, 1]; and if $K_{MPPT}=1$, the medium-voltage photovoltaic distribution system operates in a maximum power point tracking mode; and if $0 \leq K_{MPPT} < 1$, the medium-voltage photovoltaic distribution system operates in a power dispatching mode.

8. The control method according to claim 6, wherein the control method further comprises:

sampling an AC voltage signal and an AC current signal output by the DC-AC converter, and calculating an active current signal $i_d$, a reactive current signal $i_q$ and an active power signal P based on the AC voltage signal and the AC current signal;

receiving a power difference signal obtained by subtracting the active power signal P from a predetermined active power reference signal $P_{ref}$, and outputting a voltage-regulating signal by an active power loop regulator in a DC-AC converter control circuit corresponding to the DC-AC converter;

receiving the voltage-regulating signal and outputting a DC bus voltage reference signal $U_{dcref}$ by an amplitude limiting unit in the DC-AC converter control circuit;

receiving a voltage difference signal obtained by subtracting the bus voltage signal $U_{dc}$ from the DC bus voltage reference signal $U_{dcref}$ and outputting an active current reference signal $i_{dref}$ by a bus voltage loop regulator in the DC-AC converter control circuit;

receiving a first current difference signal obtained by subtracting the active current signal $i_d$ from the active current reference signal $i_{dref}$, and outputting a first modulation signal $u_{r1}$ by an active current loop regulator in the DC-AC converter control circuit;

receiving a second current difference signal obtained by subtracting the reactive current signal $i_q$ from a predetermined reactive current reference signal $i_{qref}$, and outputting a second modulation signal $u_{r2}$ by a reactive current loop regulator in the DC-AC converter control circuit;

receiving the first modulation signal $u_{r1}$ and the second modulation signal $u_{r2}$, generating a drive signal corresponding to the first modulation signal $u_{r1}$ and the second modulation signal $u_{r2}$, and outputting the drive signal to the DC-AC converter by a sine pulse width modulation wave generating circuit in the DC-AC converter control circuit.

9. A control method for a medium-voltage photovoltaic distribution system, the medium-voltage photovoltaic distribution system comprising: N photovoltaic modules, N DC-DC converters connected to the N photovoltaic modules respectively, a DC-AC converter and a line-frequency transformer connected to the DC-AC converter, wherein outputs of the N DC-DC converters are connected in parallel to a DC bus, the DC bus is connected to the DC-AC converter, the line-frequency transformer is configured to connect to a medium-voltage AC grid, and N is a natural number larger than or equal to 1, wherein the control method comprises:

step S610: sampling a bus voltage signal $U_{dc}$ of the DC bus;

step S620: sampling an AC voltage signal and an AC current signal output by the DC-AC converter, and calculating an active current signal $i_d$, a reactive current signal $i_q$ and an active power signal P based on the AC voltage signal and the AC current signal;

step S630: receiving a power difference signal obtained by subtracting the active power signal P from a predetermined active power reference signal $P_{ref}$, and outputting a voltage-regulating signal by an active power loop regulator in a DC-AC converter control circuit corresponding to the DC-AC converter;

step S640: receiving the voltage-regulating signal and outputting a DC bus voltage reference signal $U_{dcref}$ by an amplitude limiting unit in the DC-AC converter control circuit;

step S650: receiving a voltage difference signal obtained by subtracting the bus voltage signal $U_{dc}$ from the DC bus voltage reference signal $U_{dcref}$ and outputting an active current reference signal $i_{dref}$ by a bus voltage loop regulator in the DC-AC converter control circuit;

step S660: receiving a first current difference signal obtained by subtracting the active current signal $i_d$ from the active current reference signal $i_{dref}$, and outputting a first modulation signal $u_{r1}$ by an active current loop regulator in the DC-AC converter control circuit;

step S670: receiving a second current difference signal obtained by subtracting the reactive current signal $i_q$ from a predetermined reactive current reference signal $i_{qref}$, and outputting a second modulation signal $u_{r2}$ by a reactive current loop regulator in the DC-AC converter control circuit;

step S680: receiving the first modulation signal $u_{r1}$ and the second modulation signal $u_{r2}$, generating a drive signal corresponding to the first modulation signal $u_{r1}$ and the second modulation signal $u_{r2}$, and outputting the drive signal to the DC-AC converter by a sine pulse width modulation wave generating circuit in the DC-AC converter control circuit.

10. The control method according to claim 9, wherein a maximum fluctuation range of a DC bus voltage limited by the amplitude limiting unit has a highest value which is equal to a rated value of the DC bus voltage and a lowest value which is equal to a minimum value of the DC bus voltage.

* * * * *